(12) United States Patent
Park et al.

(10) Patent No.: US 12,242,024 B2
(45) Date of Patent: Mar. 4, 2025

(54) DYED LENS AND METHOD OF DYEING LENS

(71) Applicant: SAMSUNG ELECTRO-MECHANICS CO., LTD., Suwon-si (KR)

(72) Inventors: Seong Chan Park, Suwon-si (KR); Ae Rim Kim, Suwon-si (KR); Sang Hyun Kwon, Suwon-si (KR); Sang Hyeon Hong, Suwon-si (KR); Hae Sung Oh, Suwon-si (KR); Choon Keun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 420 days.

(21) Appl. No.: 17/359,840

(22) Filed: Jun. 28, 2021

(65) Prior Publication Data

US 2022/0075096 A1    Mar. 10, 2022

(30) Foreign Application Priority Data

Sep. 10, 2020  (KR) .................. 10-2020-0116071

(51) Int. Cl.
| | |
|---|---|
| *G02B 1/04* | (2006.01) |
| *B29D 11/00* | (2006.01) |
| *G02B 1/00* | (2006.01) |
| *G02B 1/10* | (2015.01) |
| *G02B 1/12* | (2006.01) |
| *G02B 3/00* | (2006.01) |

(Continued)

(52) U.S. Cl.
CPC ........ *G02B 1/041* (2013.01); *B29D 11/00009* (2013.01); *B29D 11/00903* (2013.01); *B29D 11/00923* (2013.01); *G02B 1/00* (2013.01); *G02B 1/10* (2013.01); *G02B 1/12* (2013.01); *G02B 3/00* (2013.01); *G02B 5/003* (2013.01); *G02B 13/001* (2013.01); *G02B 13/0015* (2013.01); *G02B 2003/0093* (2013.01)

(58) Field of Classification Search
None
See application file for complete search history.

(56) References Cited

U.S. PATENT DOCUMENTS

| | | |
|---|---|---|
| 2009/0239083 A1 | 9/2009 | Kojima et al. |
| 2011/0023243 A1 | 2/2011 | Kubotera et al. |

(Continued)

FOREIGN PATENT DOCUMENTS

| | | |
|---|---|---|
| CN | 101987320 A | 3/2011 |
| CN | 102652284 A | 8/2012 |

(Continued)

OTHER PUBLICATIONS

English machine translation of Takada et al. (CN 104280793 A), Description and Claims, accessed online from Espacenet; PDF pp. 1-18 is attached. (Year: 2015).*

(Continued)

*Primary Examiner* — Katie L. Hammer
(74) *Attorney, Agent, or Firm* — NSIP Law

(57) ABSTRACT

A lens includes a light-transmitting portion and a light-shielding portion adjacent to at least a portion of the light-transmitting portion and integrated with the light-transmitting portion. The light-shielding portion includes at least one of carbon nanotubes and carbon black.

5 Claims, 5 Drawing Sheets

(51) Int. Cl.
*G02B 5/00* (2006.01)
*G02B 13/00* (2006.01)

(56) References Cited

U.S. PATENT DOCUMENTS

| | | |
|---|---|---|
| 2012/0243099 A1 | 9/2012 | Kaneko |
| 2016/0178805 A1 | 6/2016 | Kang et al. |
| 2016/0313574 A1 | 10/2016 | Takedomi et al. |
| 2017/0003521 A1 | 1/2017 | Wei |
| 2017/0146701 A1 | 5/2017 | Nagahama et al. |
| 2019/0137662 A1 | 5/2019 | Abe et al. |

FOREIGN PATENT DOCUMENTS

| | | | | |
|---|---|---|---|---|
| CN | 104280793 A | * | 1/2015 | ............... G02B 1/10 |
| CN | 104898300 A | | 9/2015 | |
| CN | 105723273 A | | 6/2016 | |
| CN | 109073784 A | | 12/2018 | |
| EP | 3 037 852 A1 | | 6/2016 | |
| JP | 2002-318303 A | | 10/2002 | |
| JP | 2003-215302 A | | 7/2003 | |
| JP | 2011-164431 A | | 8/2011 | |
| JP | 2013-250440 A | | 12/2013 | |
| JP | 2015-18178 A | | 1/2015 | |
| JP | 6027775 B2 | | 11/2016 | |
| KR | 10-2009-0100295 A | | 9/2009 | |
| KR | 10-1060915 B1 | | 8/2011 | |
| KR | 10-2016-0075085 A | | 6/2016 | |
| KR | 10-2017-0031657 A | | 3/2017 | |
| TW | 201907550 A | | 2/2019 | |

OTHER PUBLICATIONS

Chinese Office Action issued on Nov. 30, 2022, in counterpart Chinese Patent Application No. 202111036995.3 (8 pages in English, 8 pages in Chinese).

Taiwanese Office Action issued on Apr. 19, 2022, in counterpart Taiwanese Patent Application No. 110124696 (6 pages in English and 7 pages in Mandarin).

Chinese Office Action issued on Jun. 7, 2023, in counterpart Chinese Patent Application No. 202111036995.3 (6 pages in English, 7 pages in Chinese).

Korean Office Action issued on Jul. 1, 2024, in counterpart Korean Patent Application No. 10-2020-0116071 (6 pages in English, 5 pages in Korean).

* cited by examiner

DYED LENS AND METHOD OF DYEING LENS

CROSS-REFERENCE TO RELATED APPLICATIONS

This application claims the benefit under 35 USC 119(a) of Korean Patent Application No. 10-2020-0116071 filed on Sep. 10, 2020, in the Korean Intellectual Property Office, the entire disclosure of which is incorporated herein by reference for all purposes.

BACKGROUND

1. Field

The following description relates to a method of dyeing a lens and a lens dyed by the method.

2. Description of Background

There may be a problem rising with regard to a lens included in a camera module, or the like, in that incident light causes internal reflection on a surface or an inner wall of the lens. Such light may cause flare on a screen, and in order to prevent the flare, it is necessary to minimize light transmittance and light reflectance in a visible light region.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a method of dyeing a lens for preventing flare and a lens dyed by the method.

Another aspect is to provide a method of dyeing a lens for minimizing light transmittance and/or light reflectance and a lens dyed by the method.

Another aspect is to provide a method of dyeing a lens to form a light-shielding portion selectively in a rib region of the lens, and a lens dyed by the method.

In one general aspect, a lens includes a light-transmitting portion and a light-shielding portion adjacent to at least a portion of the light-transmitting portion and integrated with the light-transmitting portion. The light-shielding portion may include at least one of carbon nanotubes and carbon black.

The lens may include an optical region and a rib region extending away from an optical axis in a radial direction of the optical region, and the light-shielding portion may be disposed in the rib region.

A thickness of the light-shielding portion may be 0.1 μm to 50 μm.

The lens may include at least one of polycarbonate and polyolefin.

The light-shielding portion may be exposed along a surface of the lens.

In another general aspect, a method of dyeing a lens includes preparing a lens; preparing a first dye comprising at least one of carbon nanotubes and carbon black; preparing a solvent; dispersing the first dye in the solvent; and immersing the lens in the solvent in which the first dye is dispersed.

A surface of the lens may be swollen by immersing the lens in the solvent in which the first dye is dispersed.

The first dye may be permeated into a surface of the lens by immersing the lens in the solvent in which the first dye is dispersed.

A concentration of the first dye may be 0.01 wt % to 5 wt % with respect to the solvent.

The solvent may include at least one of toluene, benzene, and hexane.

The method may include preparing a second dye and dispersing the second dye in the solvent, and the first dye and the second dye may include different components.

The second dye may include at least one of an azo dye, an anthraquinone dye, and a nitro-allylamine dye.

A concentration of the second dye may be 1 wt % to 10 wt % with respect to the solvent.

The method may include adding a surfactant to the solvent.

The method may include ultrasonicating the solvent, in which the first dye is dispersed.

Immersing the lens in the solvent in which the first dye is dispersed may be performed at a temperature of 15° C. to 40° C.

In another general aspect, a device includes a camera module comprising a dyed lens, and the dyed lens includes a dyed portion disposed outside of an optical axis and dyed with a dye that has been dispersed in an ultrasonicated solvent.

A concentration of the dye with respect to the ultrasonicated solvent may be 1 wt % or more.

The dye may include one or both of carbon nanotubes and carbon black.

A light transmittance of the dyed portion may be approximately 0.01% in a wavelength range of 350 nm to 750 nm.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
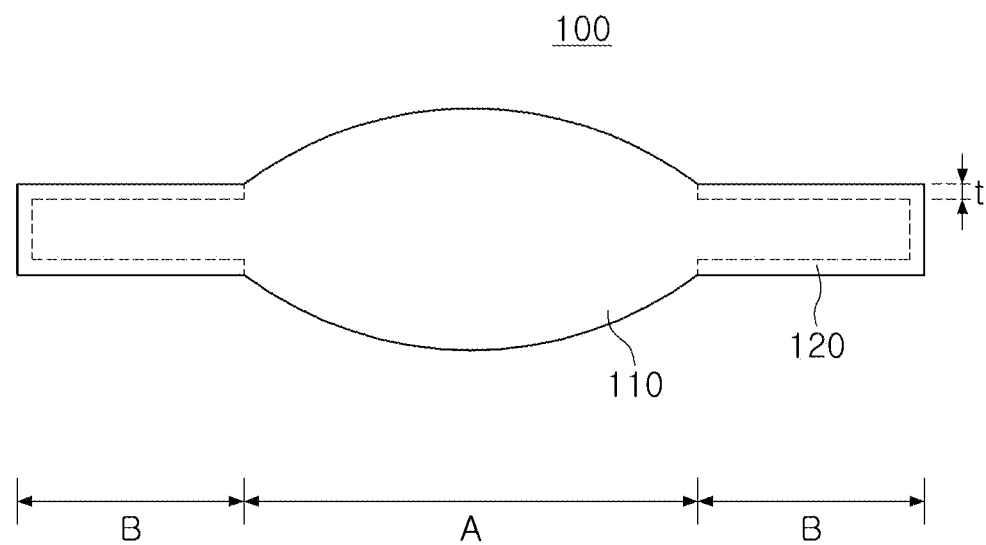
FIG. 1 is a cross-sectional view schematically illustrating a lens according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

FIG. 1 is a cross-sectional view schematically illustrating a lens according to an example.

A shape or a type of a lens 100 is not particularly limited, and any lens which can be used in optical devices, such as a camera module, or the like, may be used without limitation. The lens 100 may be a plastic resin lens including a resin component, for example, a plastic resin lens including at least one of polycarbonate and polyolefin. The polyolefin may include at least one of a cycloolefin polymer and a cycloolefin copolymer.

The lens 100 according to an example includes a light-transmitting portion 110 and a light-shielding portion 120.

The light-transmitting portion 110 refers to a region through which light can pass through. As described below, the light-shielding portion 120, a region dyed by a first dye penetrated thereinto, is formed in the lens 100, and the light-transmitting portion 110 refers to a region of the lens 100 in which the light-shielding portion 120 not formed.

The light-shielding portion 120 refers to a region formed by the first dye penetrated thereinto and may have low light transmittance and low light reflectance. The light-shielding portion 120 includes at least one of carbon nanotubes and carbon black. In this regard, the light-shielding portion 120 is formed by allowing the carbon nanotubes and/or carbon black to penetrate onto a surface of the lens 100, thereby blocking light reflection and/or light transmission. The component of carbon nanotubes and/or carbon black included in the light-shielding portion 120 of the lens 100 may be detected by Raman analysis.

The light-shielding portion 120 may be formed on a partial surface of the lens 100. For example, the light-shielding portion 120 may be formed on a portion of the surface of the lens 100 in a rib area B so as to be disposed in the rib area B, which will be described later. Specifically, the light-shielding portion 120 may be formed on at least one of a top surface, a bottom surface and side surfaces. Accordingly, the light-shielding portion 120 may be exposed to the surface of the lens 100.

A thickness t of the light-shielding portion 120 is not particularly limited and may be appropriately adjusted in accordance with an immersion condition in a process described later. For example, the thickness t of the light-shielding portion 120 may be 0.1 µm to 50 µm. The thickness may refer to a shortest distance from an outer surface of the light-shielding portion 120 exposed to the surface of the lens 100 in a direction perpendicular to the outer surface.

The expressions "light-transmitting portion 110" and "light-shielding portion 120" are terms used to distinguish between a region dyed with a first dye and a region not dyed within the same lens 100. In this regard, the light-shielding portion 120 is adjacent to at least a partial region of the light-transmitting portion 110 and may be integrated with the light-transmitting portion 110. Further, the light-transmitting portion 110 and the light-shielding portion 120 may not have a clear interface between each other.

The lens 100 according to an example may have an optical region A and a rib region B.

The optical region A may be a region in which optical performance of the lens is displayed. For example, light reflected from an object (or subject) may be refracted while passing through the optical area A.

The rib region B may be a region for fixing the lens to another lens configuration, such as a lens barrel, another lens and/or a spacer. The rib region B may be a region extending outwardly in a radial direction of the optical region A. The radial direction refers to a direction from a center of the optical region A toward an outer circumferential surface of the lens 100.

The optical region A and the rib region B also refer to regions within the same lens 100, and thus, the optical region A and the rib region B are integrated with each other.

In various examples, the light-shielding portion 120 is formed by penetrating carbon nanotubes and/or carbon black through the surface of the lens 100 without forming a separate light-shielding layer on the surface of the lens 100, such that a lens having effectively lowered light transmittance and light reflectance can be provided. The light transmittance and the light reflectance can be effectively lowered in the wavelength range of 350 nm to 750 nm. In particular, a lens in which the light transmittance and the light reflectance are effectively lowered even in the wavelength ranges of 350 nm to 450 nm and 650 nm to 750 nm, the ranges in which the light transmission and light reflection suppression are not feasible, can be provided. Accordingly, a lens for preventing flare can be provided.

Figure 2:
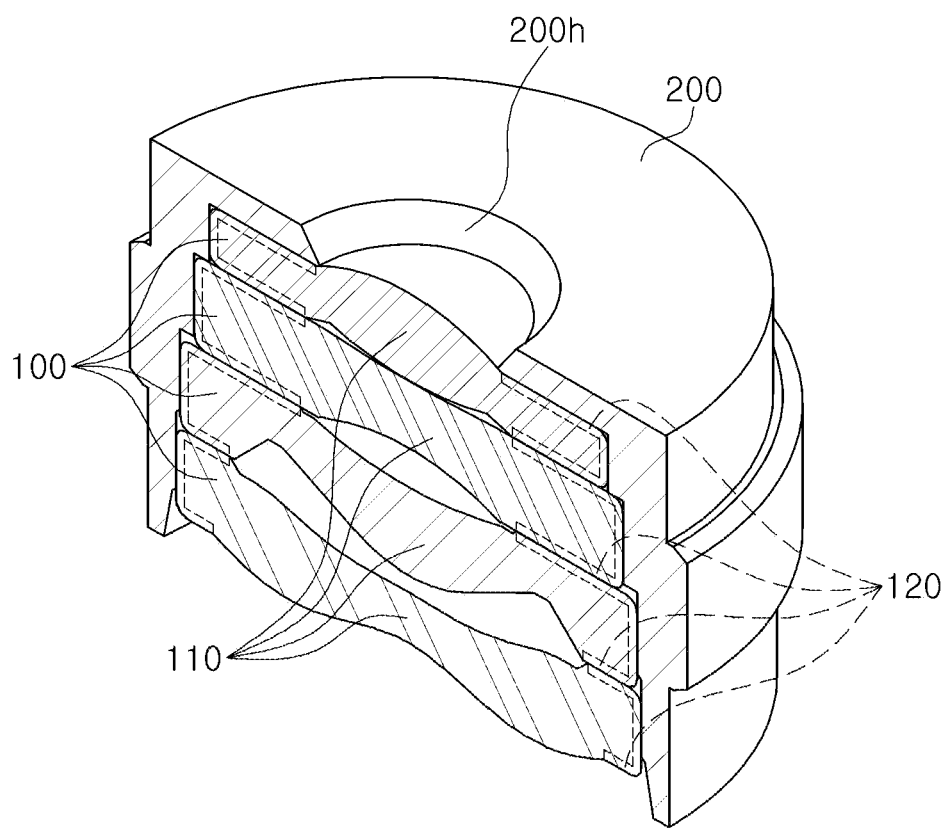
FIG. 2 is a cross-sectional view schematically illustrating a lens assembly according to an example in which a plurality of lenses is assembled.

FIG. 2 is a cross-sectional view schematically illustrating a lens assembly according to an example in which a plurality of lenses is assembled.

Referring to FIG. 2, a lens assembly includes a plurality of lenses 100, each of the lenses 100 including a light-transmitting portion 110 and a light-shielding portion 120, and a lens barrel 200 having a lens hole 200h.

The plurality of lenses 100 are stacked along an optical axis and disposed in an inner space of the lens barrel 200. In this case, a rib region of each of the plurality of lenses 100 may contact a rib region of an adjacent lens. In addition, each of the plurality of lenses 100 may contact an inner circumferential surface of the lens barrel 200.

A number of the lenses 100 is not particularly limited. Optical characteristics, such as refractive index, of each of the plurality of lenses 100 may be the same or may be different from each other.

The lens barrel 200 may have a cylindrical shape in which a hollow is formed, and the lens hole 200h for light transmission may be formed through one surface of the lens barrel 200.

Figure 3:
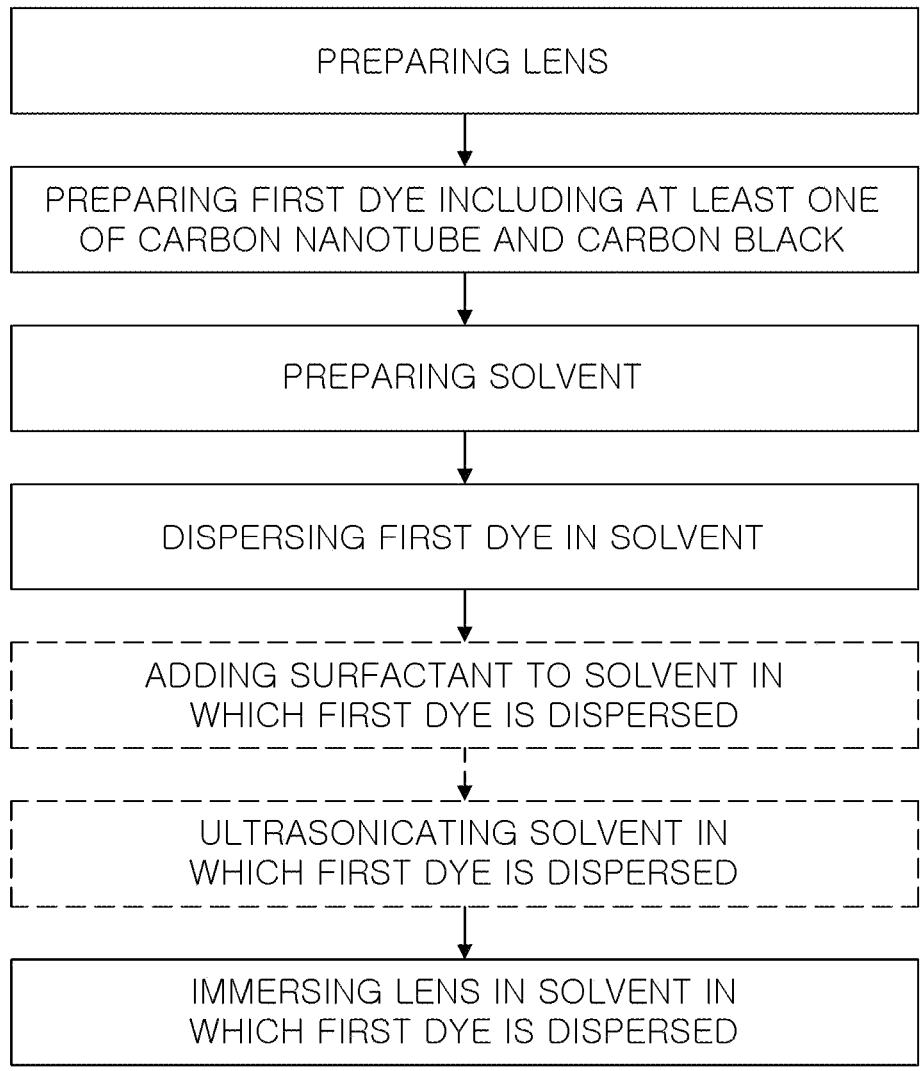
FIG. 3 is a flowchart schematically illustrating a method of dyeing a lens according to an example.

FIG. 3 is a flowchart schematically illustrating a method of dyeing a lens according to an example.

Referring to FIG. 3, a method for dyeing a lens includes preparing a lens, preparing a first dye including at least one of carbon nanotubes and carbon black, preparing a solvent, and dispersing a first dye in the solvent, and immersing the lens in the solvent in which the first dye is dispersed.

In addition, the method for dyeing a lens further includes adding a surfactant to the solvent in which the first dye is dispersed and/or ultrasonicating the solvent in which the first dye is dispersed.

A shape or a type of the lens is not particularly limited, and as described above, a plastic resin lens including at least one of polycarbonate and polyolefin may be used.

The solvent swells a surface of the lens and dissolves the first dye. Accordingly, the first dye dissolved in the solvent may penetrate onto a swollen surface of the lens to form a light-shielding portion. As the solvent, a material capable of dissolving the first dye while swelling the surface of the lens may be used. For example, the solvent may include at least one of toluene, benzene and hexane.

A concentration of the first dye with respect to the solvent is not particularly limited, but may be 0.01 wt % to 5 wt %. As shown in various examples to be described later, light transmittance can be more effectively lowered when the concentration of the first dye with respect to the solvent is 1 wt %. Meanwhile, when the concentration of the first dye is less than 0.01 wt % with respect to the solvent, required coloring power may not be exhibited, and in the case of the concentration greater than 5 wt %, dispersibility of the first dye with respect to the solvent may be lowered.

The solvent may swell the surface of the lens through the action of immersing the lens in the solvent in which the first dye is dispersed, and the first dye may penetrate into the lens through the surface of the lens.

The action of immersing the lens in the solvent in which the first dye is dispersed may be carried out at a temperature of 15° C. to 40° C. In the case of immersing the lens in the solvent under such a temperature condition, it is possible to reduce a time required for coloring the first dye without damaging the lens, leading to an advantageous effect on productivity.

Meanwhile, when the surfactant is added to the solvent in which the first dye is dispersed, the first dye can more efficiently penetrate onto the surface of the lens.

In addition, even when the solvent in which the first dye is dispersed is subjected to ultrasonic treatment, the first dye may more efficiently penetrate onto the surface of the lens.

In the method of dyeing a lens according to the present disclosure, the solvent swells the surface of the lens and the first dye penetrates onto the surface of the swollen lens, thereby selectively dyeing only an area in which light transmission and light reflection of the lens need to be suppressed. Accordingly, a light-shielding portion may be formed by penetrating carbon nanotubes and/or carbon black through the surface of the lens without forming a separate light-shielding layer on the surface of the lens.

Actions included in the method for dyeing a lens according to an example are not limited to the order shown in FIG. 3 and may include actions of changing, deleting and/or adding.

Figure 4:
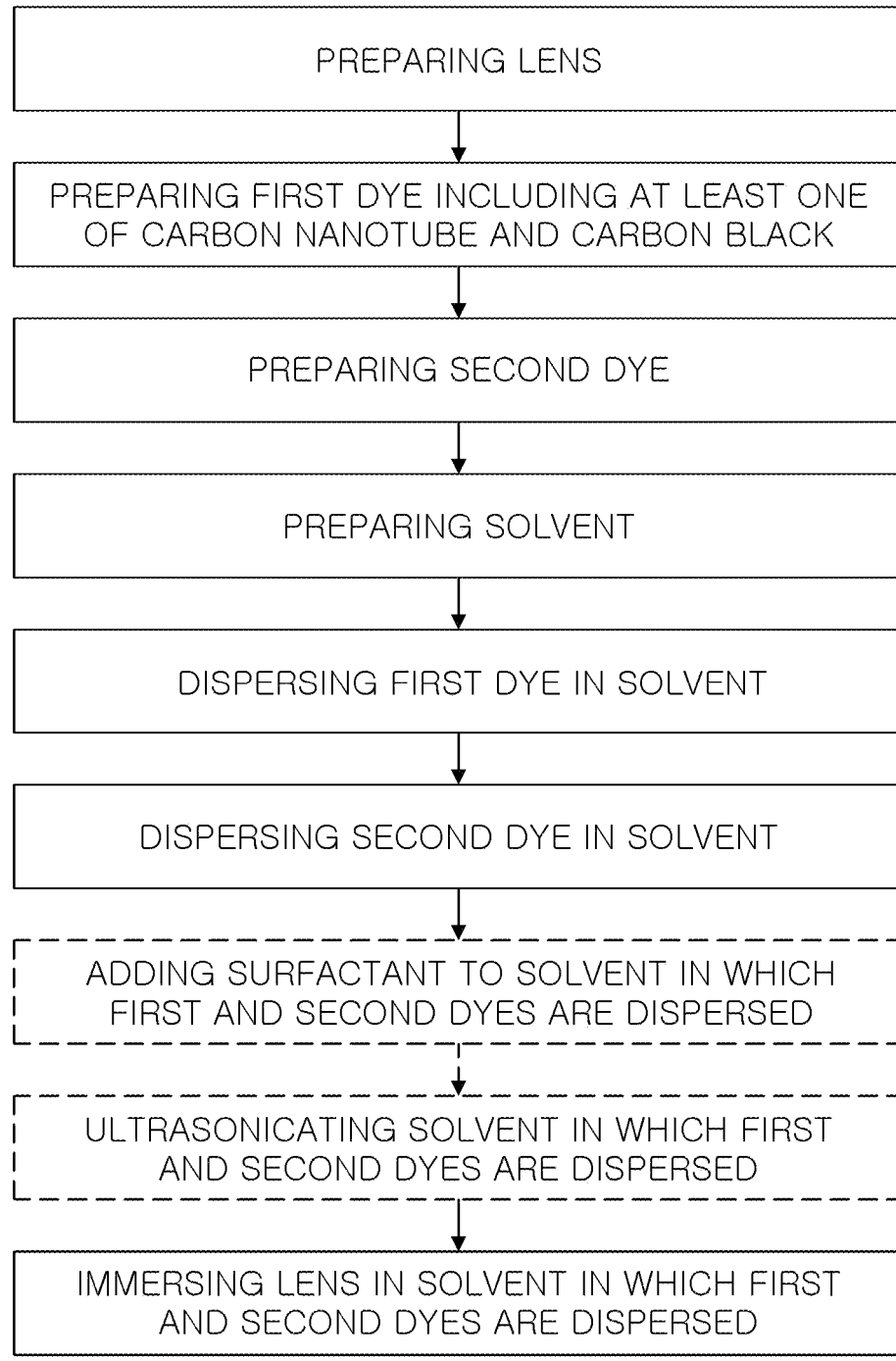
FIG. 4 is a flowchart schematically illustrating a method of dyeing a lens according to another example.

FIG. 4 is a flowchart schematically illustrating a method of dying a lens according to another example.

A method of dyeing a lens according to another example includes preparing a lens, preparing a first dye including at least one of carbon nanotubes and carbon black, preparing a second dye, preparing a solvent, dispersing the first dye in the solvent, dispersing the second dye in the solvent, immersing the lens in the solvent in which the first dye and the second dye are dispersed.

In addition, the method of dyeing a lens may further include adding a surfactant to the solvent in which the first dye and the second dye are dispersed and/or ultrasonicating the solvent in which the first dye and the second dye are dispersed.

The method of dyeing a lens according to another example involves using the first dye and the second dye together, and other details may be applied substantially the same as the method of dyeing a lens according to the example of FIG. 3.

As the second dye, a dye usable for dyeing a lens may be used without limitation. For example, the second dye may include at least one of an azo dye, an anthraquinone dye and a nitro-allylamine dye.

A concentration of the second dye with respect to the solvent is not particularly limited, but may be 1 wt % to 10 wt %.

Meanwhile, actions included in the method for dyeing a lens according to an example are not limited to the order shown in FIG. 4 and may include actions of changing, deleting and/or adding.

The present disclosure will be described in more detail with reference to the following examples and comparative examples. However, the spirit of the present disclosure is not limited to the various examples described later.

Figure 5:
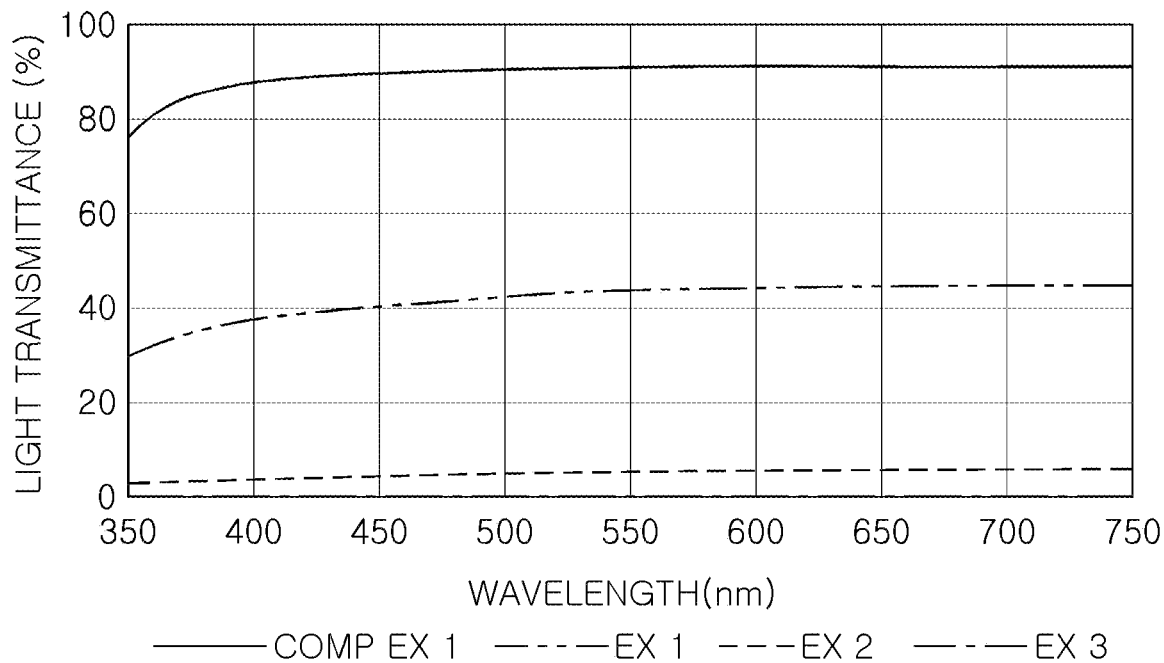
FIG. 5 is a graph illustrating light transmittance of a lens according to an example of the present disclosure and light transmittance of a lens according to a comparative example.

FIG. 5 is a graph illustrating light transmittance of a lens according to an example of the present disclosure and light transmittance of a lens according to a comparative example.

Figure 6:
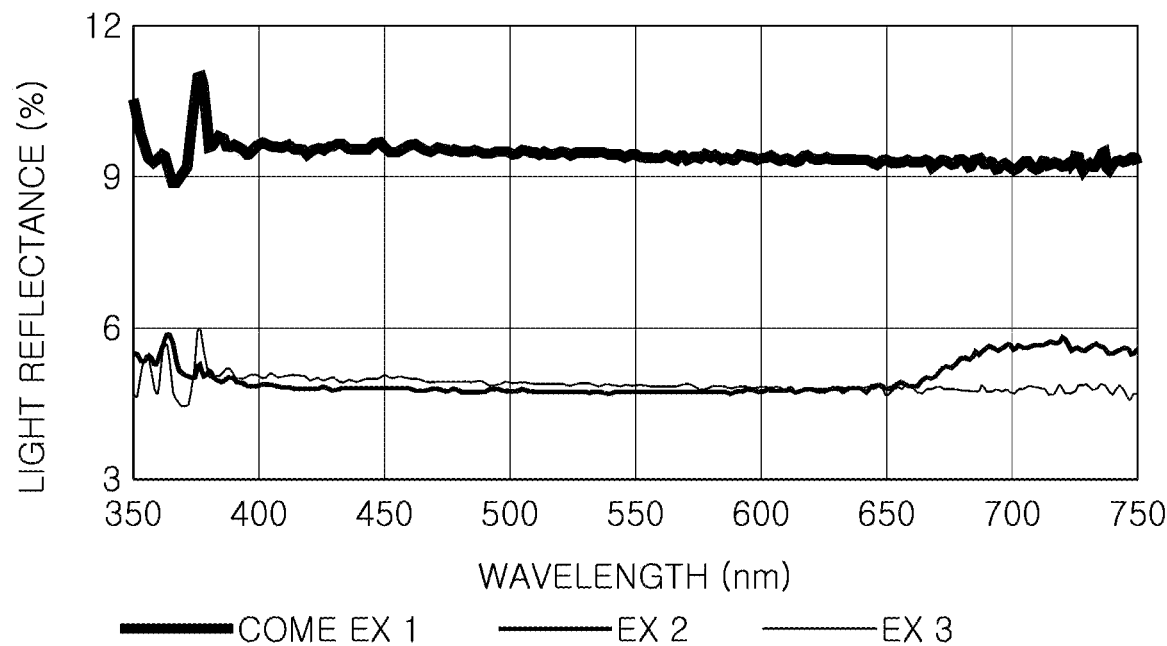
FIG. 6 is a graph illustrating light reflectance of a lens according to an example of the present disclosure and light transmittance of a lens according to a comparative example.

FIG. 6 is a graph illustrating light reflectance of a lens according to an example of the present disclosure and light transmittance of a lens according to a comparative example.

Comparative Example 1

Light transmittance and light reflectance of a cycloolefin copolymer resin lens were measured. That is, the light transmittance and light reflectance of the lens in which the light-shielding portion were not formed were measured.

Example 1

A cycloolefin copolymer resin lens was used as the lens, carbon black was used as the first dye, and toluene was used as the solvent. The concentration of the first dye to the solvent was 0.01% by weight.

Example 2

A cycloolefin copolymer resin lens was used as the lens, and carbon black was used as the first dye, while toluene was used as the solvent. A concentration of the first dye with respect to the solvent was 1 wt %. That is, the remaining conditions were applied to Example 2 in the same manner as to Example 1 except for the concentration of the first dye in the solvent.

Example 3

A cycloolefin copolymer resin lens was used as the lens, and carbon black was used as the first dye, while toluene was used as the solvent. A concentration of the first dye with respect to the solvent was 1 wt %. In addition, before immersing the lens in the solvent in which the first dye was dispersed, the solvent was ultrasonicated. That is, the remaining conditions were applied to Example 3 in the same manner as to Example 2 except for additionally performing ultrasonic treatment.

TABLE 1

|  | 1$^{st}$ dye type/conc | Solvent | Ultrasonication |
| --- | --- | --- | --- |
| Comp Ex 1 | — | — | — |
| Ex 1 | Carbon black/0.01 wt % | Toluene | X |
| Ex 2 | Carbon black/1 wt % | Toluene | X |
| Ex 3 | Carbon black/1 wt % | Toluene | ○ |

Referring to FIGS. 5 and 6, the light transmittance and light reflectance of Examples 1 to 3 were significantly reduced as compared to those of Comparative Example 1.

In particular, in the case of Example 2 employing 1 wt % or more of carbon black, the light transmittance was reduced to about 5% in the wavelength range of 350 nm to 750 nm. In the case of Example 3 involving additionally performing ultrasonic treatment, the light transmittance was reduced to be close to 0.01% in the wavelength range of 350 nm to 750 nm. That is, the light transmittance can be more effectively lowered when the concentration of the first dye with respect to the solvent is 1 wt % or more. In contrast, in the case of Comparative Example 1, the light transmittance in the wavelength range of 350 nm to 750 nm was measured to be about 75% or more.

Further, in the cases of Example 2 employing 1 wt % or more of carbon black and Example 3 involving additionally performing ultrasonic treatment, the light reflectance was reduced to about 5% in the wavelength range of 350 nm to 750 nm. In the case of Comparative Example 1, the light reflectance in the wavelength range of 350 nm to 750 nm was measured to be relatively high, about 10%.

Meanwhile, although not shown in detail in the drawings, it was confirmed that similarly to the case of employing carbon black, the light transmittance and the light reflectance were also reduced in the case of the examples employing carbon nanotubes instead of carbon black.

Figure 7:
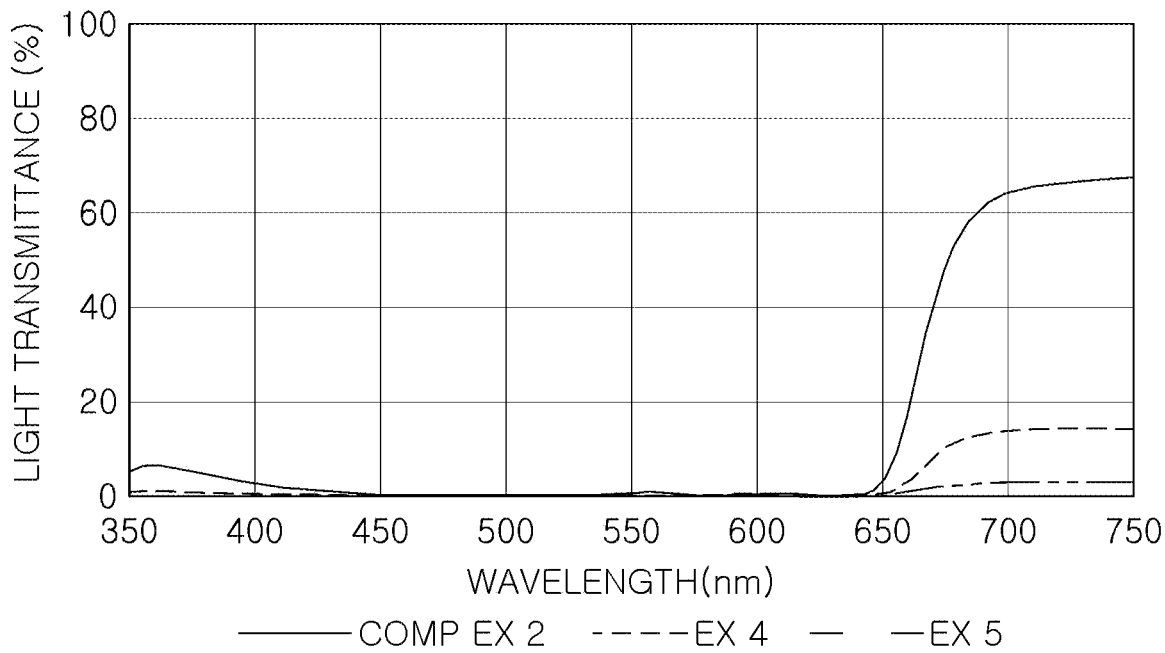
FIG. 7 is a graph illustrating light transmittance of a lens according to another example of the present disclosure and light transmittance of a lens according to a comparative example.

FIG. 7 is a graph illustrating light transmittance of a lens according to another example of the present disclosure and light transmittance of a lens according to a comparative example.

Figure 8:
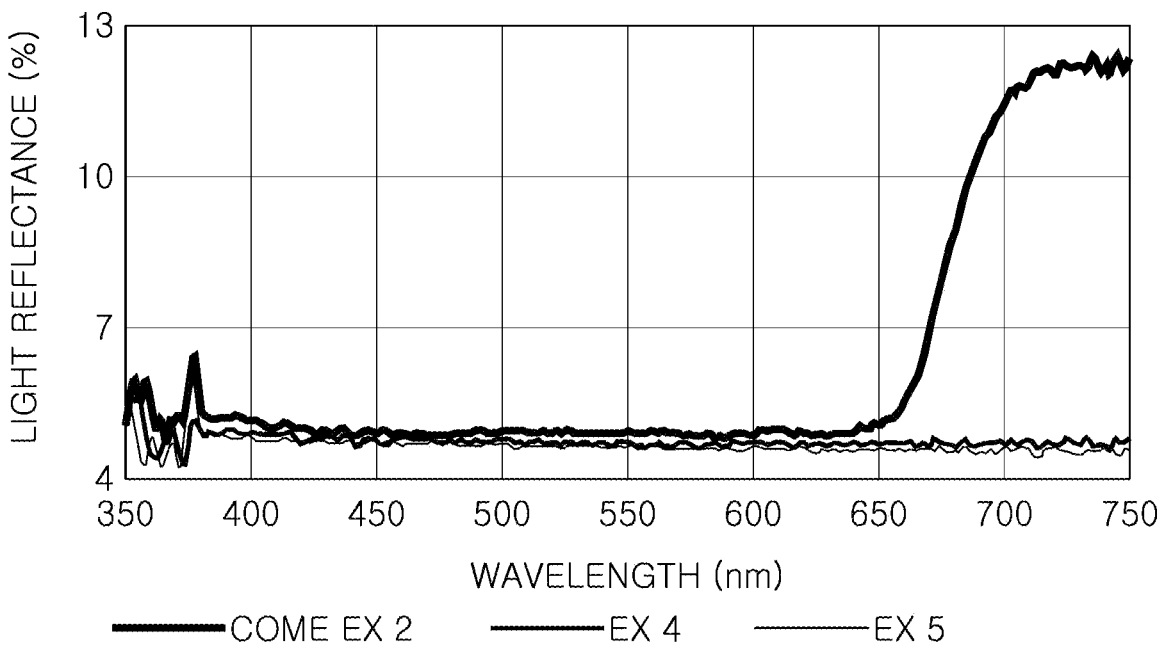
FIG. 8 is a graph illustrating light reflectance of a lens according to another example of the present disclosure and light transmittance of a lens according to a comparative example.

FIG. 8 is a graph illustrating light reflectance of a lens according to another example of the present disclosure and light transmittance of a lens according to a comparative example.

Comparative Example 2

A cycloolefin copolymer resin lens was used as the lens, and an anthraquinone-based dye was used as the second dye, while toluene was used as the solvent. A concentration of the second dye with respect to the solvent was 5 wt %. In the case of Comparative Example 2, the first dye was not used.

Example 4

A cycloolefin copolymer resin lens was used as the lens, and carbon black was used as the first dye, while anthraquinone dye was used as the second dye and toluene was used as the solvent. A concentration of the first dye with respect to the solvent was 1 wt %, and that of the second dye with respect to the solvent was 5 wt %.

Example 5

A cycloolefin copolymer resin lens was used as the lens, and carbon black was used as the first dye, while anthraquinone dye was used as the second dye, and toluene was used as the solvent. A concentration of the first dye with respect to the solvent was 1 wt %, and that of the second dye with respect to the solvent was 5 wt %. In addition, the solvent was ultrasonicated before immersing the lens in the solvent in which the first dye and the second dye are dispersed. That is, the remaining conditions were applied to Example 5 in the same manner as to Example 4 except for additionally performing ultrasonic treatment.

TABLE 2

| | 1st dye type/conc | 2nd dye type/conc | Solvent | Ultrasonication |
|---|---|---|---|---|
| Comp Ex 2 | — | Anthraquinone dye/5 wt % | Toluene | — |
| Ex 4 | Carbon black/1 wt % | Anthraquinone dye/5 wt % | Toluene | X |
| Ex 5 | Carbon black/1 wt % | Anthraquinone dye/5 wt % | Toluene | ○ |

Referring to FIGS. 7 and 8, the light transmittance and light reflectance of Examples 4 and 5 were reduced in the wavelength range of 350 nm to 750 nm as compared to those of Comparative Example 2.

In particular, the light transmittance and light reflectance of Examples 4 and 5 and those of Comparative Example 2 were shown to have a significant difference in the wavelength ranges of 350 nm to 450 nm and 650 nm to 750 nm.

Further, the light transmittance of Examples 4 and 5 were measured to be close to 0 in the wavelength range of 450 nm to 650 nm.

Meanwhile, although not shown in detail in the drawings, it was confirmed that similarly to the case of employing carbon black, the light transmittance and the light reflectance were also reduced in the case of the examples employing carbon nanotubes instead of carbon black.

As set forth above, according to various examples, a method of dyeing a lens to prevent flare and a lens dyed by the method is provided.

According to various examples, a method of dyeing a lens to minimize light transmittance and/or light reflectance and a lens dyed by the method is provided.

According to various examples, a method of dyeing a lens to selectively form a light-shielding portion in a rib region of the lens and a lens dyed by the method is provided.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens, comprising:
   a light-transmitting portion; and
   a light-shielding portion disposed adjacent to at least a portion of the light-transmitting portion, and integrated with the light-transmitting portion,
   wherein the light-shielding portion comprises a dye including at least one of carbon nanotubes and carbon black permeated into the lens below an outer surface of the lens without forming a separate light-shielding layer on the outer surface of the lens, and
   wherein a thickness of the light-shielding portion is 0.1 μm to 50 μm.

2. The lens of claim 1, wherein:
   the lens comprises an optical region and a rib region extending away from an optical axis in a radial direction of the optical region, and
   the light-shielding portion is disposed in the rib region.

3. The lens of claim 1, wherein the lens comprises at least one of polycarbonate and polyolefin.

4. The lens of claim 1, wherein the light-shielding portion is exposed along an inner surface of the lens.

5. The lens of claim 1, wherein an outer surface of the light-transmitting portion and an outer surface of the light-shielding portion form a single uniform surface.

* * * * *